(12) United States Patent
Sharabi et al.

(10) Patent No.: US 12,395,493 B2
(45) Date of Patent: Aug. 19, 2025

(54) MULTI-TENANT SECURITY IN THE CLOUD

(71) Applicant: NetApp Inc., Sunnyvale, CA (US)

(72) Inventors: Dekel Sharabi, Tel-Aviv (IL); Ofer Nivy, Tel-Aviv (IL)

(73) Assignee: NetApp, Inc., San Jose, CA (US)

( * ) Notice: Subject to any disclaimer, the term of this patent is extended or adjusted under 35 U.S.C. 154(b) by 906 days.

(21) Appl. No.: 17/100,983

(22) Filed: Nov. 23, 2020

(65) Prior Publication Data
US 2021/0105284 A1 Apr. 8, 2021

Related U.S. Application Data

(63) Continuation of application No. 14/572,443, filed on Dec. 16, 2014, now Pat. No. 10,855,688.

(51) Int. Cl.
*H04L 9/00* (2022.01)
*G06F 21/62* (2013.01)
*H04L 9/40* (2022.01)

(52) U.S. Cl.
CPC ........ H04L 63/105 (2013.01); G06F 21/6218 (2013.01); H04L 63/08 (2013.01)

(58) Field of Classification Search
CPC .... H04L 63/105; H04L 63/08; G06F 21/6218
USPC .......................................................... 726/5
See application file for complete search history.

(56) References Cited

U.S. PATENT DOCUMENTS

| | | | |
|---|---|---|---|
| 7,882,538 B1 | 2/2011 | Palmer | |
| 8,413,211 B2 | 4/2013 | Tokutani et al. | |
| 8,635,707 B1 * | 1/2014 | Parenti | G06F 21/6218 713/193 |
| 9,058,481 B2 | 6/2015 | Prasad et al. | |
| 9,602,341 B1 * | 3/2017 | Degwekar | H04L 41/0806 |
| 10,855,688 B2 | 12/2020 | Sharabi et al. | |
| 2002/0095571 A1 * | 7/2002 | Bradee | G06F 21/6236 713/164 |
| 2009/0007098 A1 * | 1/2009 | Chevrette | G06F 8/65 717/177 |
| 2011/0162046 A1 * | 6/2011 | Forster | G06F 21/41 726/4 |
| 2013/0067540 A1 * | 3/2013 | Mukkara | H04L 69/326 709/227 |
| 2013/0103639 A1 * | 4/2013 | Greenberg | H04W 4/60 707/E17.005 |
| 2013/0191895 A1 * | 7/2013 | Magee | G06F 21/33 726/6 |
| 2014/0040999 A1 | 2/2014 | Zhang et al. | |
| 2014/0189811 A1 | 7/2014 | Taylor et al. | |
| 2014/0196115 A1 * | 7/2014 | Pelykh | H04L 63/08 726/4 |
| 2015/0180872 A1 | 6/2015 | Christner | |

* cited by examiner

*Primary Examiner* — Christopher J Brown
(74) *Attorney, Agent, or Firm* — Cooper Legal Group, LLC

(57) ABSTRACT

A cloud asset manager can securely provide multi-tenant access to remote assets while preserving isolation across tenants. The remote asset manager defines various roles for legitimate users of the remote asset manager. The roles are associated with credentials that provide access to the remote assets and/or information about the remote assets maintained by a service provider. And the users map to roles based on attempted actions that access the service provider. Thus, a user's requested action is attempted with credentials associated with a role that maps to the requested action.

18 Claims, 5 Drawing Sheets

MULTI-TENANT SECURITY IN THE CLOUD

RELATED APPLICATION

This application claims priority to and is a continuation of U.S. application Ser. No. 14/572,443, filed on Dec. 16, 2014, now allowed, titled "MULTI-TENANT SECURITY IN THE CLOUD," which is incorporated herein by reference.

BACKGROUND

Embodiments of the inventive subject matter generally relate to the field of computing security, and, more particularly, to secure isolation of remote assets in a multi-tenant environment.

A cloud service provider can offer software as a service (SaaS), infrastructure as a service (IaaS), or both. The cloud service provider can offer access to software as a service, in the case of SaaS, to numerous customers. In the case of IaaS, the service provider offers access to the capabilities of various equipment (e.g., servers, networking devices, storage arrays, etc.), while the service provider maintains the equipment. In both cases, multiple customers may share access to the equipment or an instance of an application. The customers that share a cloud asset (e.g., application instance, server, etc.) are referred to as tenants. In a multi-tenant environment, isolation and security among tenants becomes challenging and necessary.

SUMMARY

A cloud asset manager, also referred to as a remote asset manager herein, can securely provide multi-tenant access to remote assets while preserving isolation across tenants. The remote asset manager defines various roles for legitimate users of the remote asset manager. The roles are associated with credentials that provide access to the remote assets and/or information about the remote assets maintained by a service provider. And the users map to roles based on attempted actions that access the service provider. Thus, a user's requested action is attempted with credentials associated with a role that maps to the requested action.

This summary section is provided as an initial glimpse into the disclosure, and is not a comprehensive summary. The content of the summary is not intended to limit scope of the claims and should not be used to limit scope of the claims.

BRIEF DESCRIPTION OF THE DRAWINGS

The accompanying drawings are provided to aid in illustrating and explaining the disclosure.

DESCRIPTION OF EMBODIMENT(S)

The description that follows includes example systems, methods, techniques, and program code that embody techniques of the disclosure. However, it is understood these examples provide context and explanation for understanding the disclosure and are not to limit the scope of the claims. For instance, although examples presume a tenant corresponds to a user account or user identifier, a tenant can correspond to a group of users, group of user accounts, a user group identifier, daemon, or executing process. In other instances, well-known instruction instances, protocols, structures and techniques have not been shown in detail in order not to obfuscate the description.

Terminology

This description refers to a "remote asset manager." The remote asset manager is a construct used to refer to implementation of functionality for multi-tenant isolation and security. A remote asset manager may be a machine-executable program, a collection of machine-executable programs, firmware, a machine programmed for multi-tenant isolation and security, etc. The term is used to aid in explaining content of the disclosure.

This description uses the term "role" to refer to an identifier/indicator that provides a level of indirection between a tenant (e.g., authenticated user) and credentials for accessing service provider resources that support remote assets. Typically, a "role" is defined to correspond to a user's role in an organization (e.g., network administrator). However, the typical use of role does not limit the claims of this disclosure. For instance, a role can be defined based on organization of remote assets (e.g., a role domain1).

Introduction

During initial setup, an administrator can define various roles in a remote asset manager. The administrator can also create an account(s) with a service provider. The credentials provided for the account from the service provider are associated with a role defined by the administrator (e.g., administrator role). Users, who log in to the remote asset manager, are bound to roles as defined by the administrator. For instance, the administrator can define different roles per department of an organization and based on each user's title within the organization. For remote assets, allowing users to view the remote assets managed by a remote asset manager provides flexibility and efficiency to manage the remote assets, even across different departments. Although viewing the remote assets can provide flexibility and efficiencies in managing them, this latitude in access can be limited to viewing actions. To satisfy security concerns and preserve isolation, users are bound to different roles depending upon the action being taken.

Example Illustrations

Figure 1:
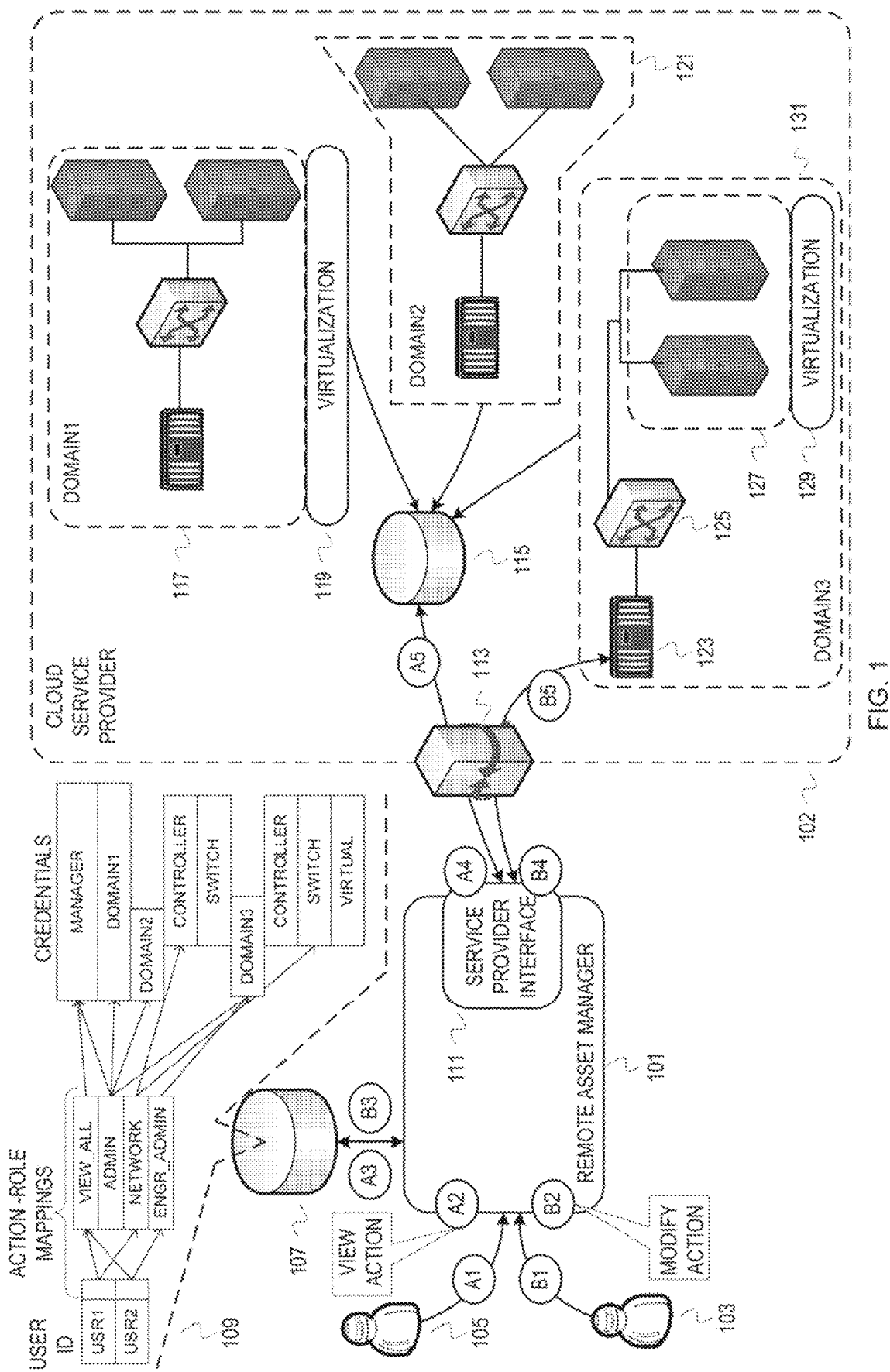
FIG. 1 depicts an example scenario of two tenants accessing remote assets via a cloud asset manager.

FIG. 1 depicts an example scenario of two tenants accessing remote assets via a cloud asset manager. In FIG. 1, a remote asset manager 101 provides access to remote assets supported by a cloud service provider 102. In this example illustration, the cloud service provider 102 supports virtual assets and co-located assets. A domain 1 117 is depicted as including virtual assets above a virtualization layer 119. A domain 2 121 is depicted as including co-located assets, which include a storage controller, a network switch, and two storage arrays. A domain 3 131 is a hybrid domain. The domain 3 131 includes a co-located storage controller 123, a co-located network switch 125, and virtualized storage arrays 127. The virtualized storage arrays 127 are supported by a virtualization layer 129. The cloud service provider 102 also includes a database 115 with information about the remote assets (e.g., elements, configurations, domain topography, etc.). Access to the remote assets and database 115 is through a service provider gateway 113. A single gateway is depicted for simplicity even though a service provider likely has multiple gateways in disparate geographic locations. The remote asset manager 101 includes a service provider interface 111. The service provider interface 111 forms requests as appropriate for the cloud service provider 102 and directs the requests to the gateway 113.

FIG. 1 illustrates a series of example operations with stages A1-A5 and B1-B5. These stages are example stages provided to aid in understanding the illustration and do not require the particular example operations and do not require any particular operational order with respect to claim scope.

The stages A1-A5 correspond to a user 105. At a stage A1, the user 105 logs into the remote asset manager 101 and is authenticated. At stage A2, a user interface of the remote asset manager 101 detects an action requested by the user 105. The action, in this example, is a request to view remote assets of domain 1 117 and domain 2 121. At stage A3, the remote asset manager 101 retrieves credentials for the requested action from a data store 107. The data store 107 may be accessible to the remote asset manager 101 but separate from the remote asset manager 101. The data store 107 may be part of the remote asset manager 101. The data store 107 can take any of a variety of forms, examples of which include hardware lookup tables, databases, in-memory structures, etc. The remote asset manager 101 determines that the user 105 logged in as USR1, and that USR1 maps to a VIEW_ALL role and a NETWORK role, depending upon the action being requested. The viewing action, in this case, maps to the VIEW_ALL role, while all other non-viewing actions map to the NETWORK role. The remote asset manager 101 obtains the credentials associated with the VIEW_ALL role. In this illustration, the MANAGER credentials are associated with the VIEW_ALL role. The view action is submitted to the service provider interface 111 with the MANAGER credentials. At stage A4, the service provider interface 111 forms a request that indicates the view action and the MANAGER credentials. The request is formed as appropriate for the cloud service provider 102. The service provider interface 111 then submits the formed request to the gateway 113.

At stage A5, the gateway 113 directs the request to the appropriate element within the cloud service provider 102. For this viewing request, the cloud service provider element (not depicted) accesses the database 115 to obtain the data about domain 1 117 and domain 2 121 that satisfies the view request. This data is then provided back to the remote asset manager 101 for presentation to the user 105.

In contrast to stages A1-A5, stages B1-B5 correspond to a non-view action by the user 103. At stage B1, the user 103 logs into the remote asset manager 101 and is authenticated. At stage B2, the user interface of the remote asset manager 101 detects a non-viewing action requested by the user 105. The action, in this example, is a request to configure the storage controller 123 in domain 3 131. At stage B3, the remote asset manager 101 retrieves credentials for the requested action from the data store 107. The remote asset manager 101 determines that the user 103 logged in as USR2, and that USR2 maps to the VIEW_ALL role and an ENGR_ADMIN role, depending upon the action being requested. The configuration action, in this case, maps to the ENGR_ADMIN role. The remote asset manager 101 obtains the credentials associated with the ENGR_ADMIN role. In this illustration, all of the domain 3 credentials are associated with the ENGR_ADMIN role. This includes the credentials for the storage controller 123. The configuration action is submitted to the service provider interface 111 with the DOMAIN3/CONTROLLER credentials. At stage B4, the service provider interface 111 forms a request that indicates the configuration action and the DOMAIN3/CONTROLLER credentials. The request is formed as appropriate for the cloud service provider 102. The service provider interface 111 then submits the formed request to the gateway 113.

At stage B5, the gateway 113 directs the request to the storage controller 123. This request logs the user 103 into the storage controller 123. Security policies defined at the storage controller 123 will be applied based on the login associated with the credentials DOMAIN3/CONTROLLER. An interface for the storage controller 123 can be presented within the remote asset manager 101 to allow the user 103 to carry out the configuration.

Although FIG. 1 depicts a remote asset manager external to the cloud service provider, embodiments are not limited in this way. A remote asset manager can be instantiated within the cloud service provider infrastructure (e.g., a server of the remote service provider). In the case of the remote asset manager running within the cloud service provider, users/processes can log into the remote asset manager with various login mechanisms (e.g., a browser, a proprietary client program, etc.).

As illustrated in FIG. 1, access to remote assets is based on having the proper credentials. The remote asset manager maintains separation of credentials by roles, which isolates tenants from each other depending upon how the roles are configured. This isolation is maintained while allowing efficient use of the remote asset manager by mapping actions to the different roles configured on the remote asset manager.

Figure 2:
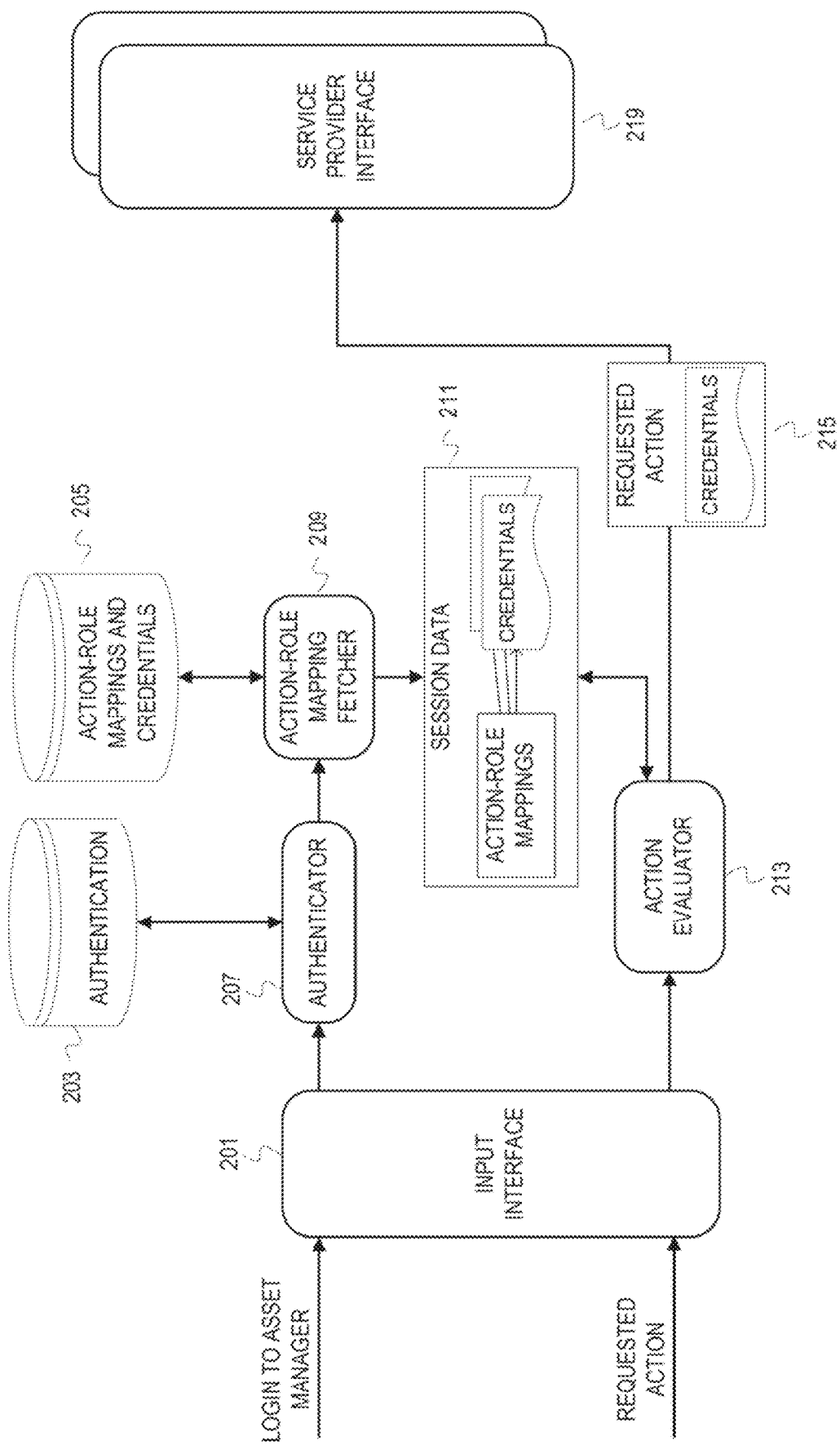
FIG. 2 depicts a conceptual diagram of an example remote asset manager to illustrate the relationship across actions, roles, and credentials.

FIG. 2 depicts a conceptual diagram of an example remote asset manager to illustrate the relationship across actions, roles, and credentials. This example remote asset manager is depicted as having an input interface 201, an authenticator 207, an action-role mapping fetcher 209, and an action evaluator 213. FIG. 2 also depicts service provider interfaces 219. Multiple service provider interfaces 219 are depicted to encompass the possibility that the remote asset manager interfaces with different service providers. Although depicted as part of the remote asset manager, it is not necessary for a remote asset manager to be implemented with the service provider interfaces. A remote asset manager can communicate with another entity (e.g., program, extension, etc.) that implements service provider interfaces.

The input interface 201, authenticator 207, and action-role mapping fetcher 209 operate after login information is submitted to the remote asset manager. The input interface 201 can accept input from users, processes, etc. The input can be login information, role configuration, requested actions, etc. When the input interface 201 receives login information, the input interface 201 passes the login information to the authenticator 207. The authenticator 207 attempts to authenticate the login information (e.g., user identifier and password, biometric data recognition, process identifier, etc.) using authentication data 203. If authenticated, the authenticator 207 communicates an indication of the login (e.g., account identifier or user identifier) to the action-role mapping fetcher 209. The action-role mapping fetcher 209 uses this information and accesses action-role mappings and credentials data 205 to determine action-role mappings associated with the login, as well as the credentials associated with the determined roles. Although depicted as a single grouping of data, the data 205 can be structured differently. The credentials can be encrypted, for example, and only accessible with a key assigned to the remote asset manager or an administrator of the remote asset manager. The action-role mapping fetcher 209 then caches this data (i.e., the action-role mappings and credentials for the roles) as session data 211.

After authentication, an action can be requested via the input interface 201. Examples of the requested action include a typed in command, an action selected from a drop down menu, activation of a graphical indication of an action, and a command message received over a network interface or via inter-process communication. When the input interface 201 receives a requested action after an authenticated login, the requested action is indicated to the action evaluator 213. The action evaluator 213 accesses the cached session data based on the indication of the requested action to determine the proper role to use. For instance, the action may be a request to set a configuration in a co-located switch in a service provider. The action evaluator 213 would determine whether cached session data 211 indicated a corresponding action in the action-role mappings. The corresponding action indicated in the mappings can range from an indication of the particular configuration being requested to a category, such as non-viewing action. The action can also be distinguished based on target. For example, the action-role mappings can distinguish between an action to configure a switch and an action to configure a storage controller. The action evaluator 213 follows the action-role mapping that corresponds to the requested action, and uses the mapped role. The action evaluator 213 also retrieves the credentials for that role from the cached session data 211.

After determining a role and obtaining the credentials for that role, the obtained information is submitted with the action to the service provider. The action evaluator 213 associated the credentials with the requested action. The requested action and the obtained credentials 215 are submitted to an appropriate one of the service provider interfaces 219. If there are multiple service provider interfaces, then the credentials and/or the role can indicate the service provider. The action evaluator 213 will use the indication of the service provider to choose or invoke the proper service provider interface. For example, a remote asset manager may have a data structure that associates indications of service providers with function calls for the service provider. The action evaluator 213 can select an entry in the data structure based on the indication of the service provider, and invoke the associated function call with the requested action and credentials. The service provider interface 219 that receives the requested action and credentials 215 will determine an appropriate target in the service provider or entry point and convey the requested action with credentials 215. The service provider interface 219 may construct or form a request from the received information as appropriate for the service provider (e.g., formatting, destination, etc.).

As already explained, FIG. 2 is an example of a remote asset manager provided to help understand possible implementations of a remote asset manager. The illustrated individual components are constructions based on functionality to aid in understanding the functionality. FIG. 2 should not be used to narrow claim scope to particular modules or program organization. For instance, a separate module (e.g., sub-program, function, procedure, etc.) may be responsible for retrieving credentials associated with a role. This module may be separated to secure the credentials.

Figure 3:
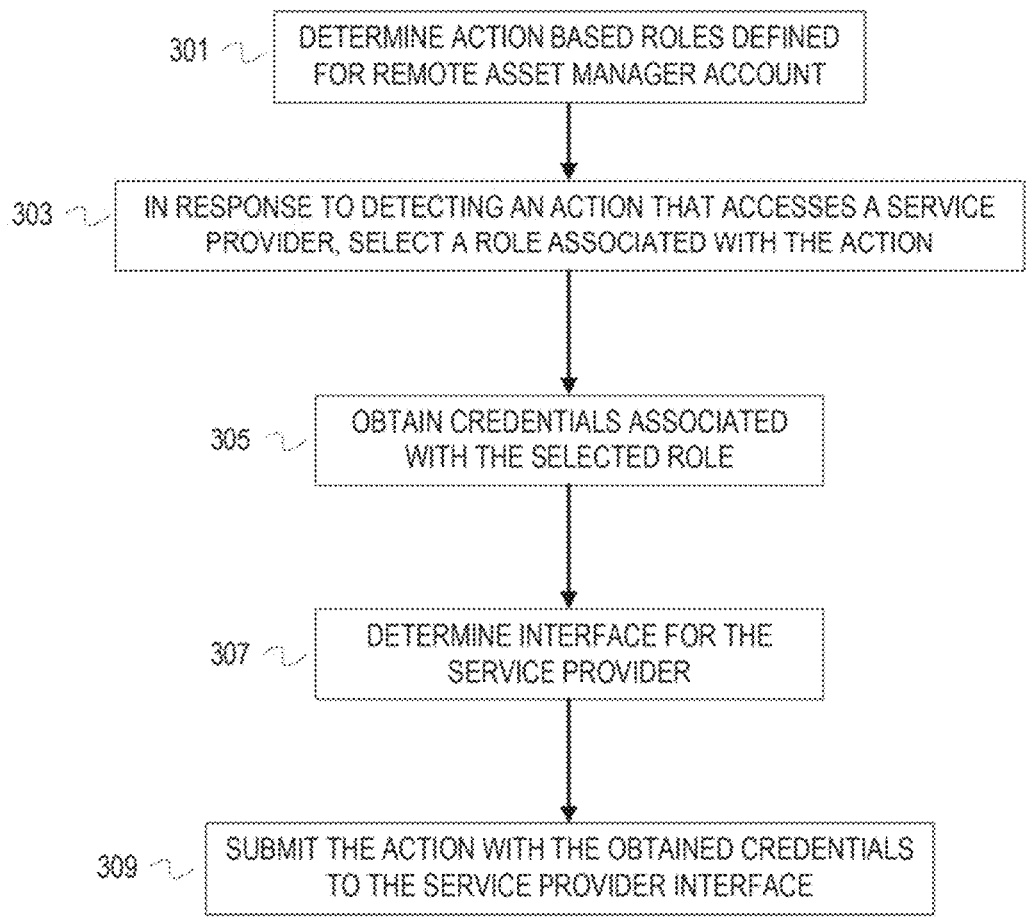
FIG. 3 is a flowchart of coarse grained example operations for isolating tenants with action based roles in a multi-tenant environment.

FIG. 3 is a flowchart of coarse grained example operations for isolating tenants with action based roles in a multi-tenant environment. The example operations are described as if performed by a remote asset manager.

At block 301, the remote asset manager determines action based roles defined for a remote asset manager account. The action based roles are roles that map to particular actions or groups of actions for an authenticated account (e.g., user). As stated earlier, an administrator can setup multiple accounts in the remote asset manager. The administrator can also configure different roles based on different actions and different assets in a service provider. Some assets and roles are defined within an account. For instance, a user may access a service provider with a role and credentials established for the remote asset manager or established by an administrator. The user can then create a virtual storage environment with service provider resources. The service provider can generate credentials for accessing this created virtual storage environment. In response, the remote asset manager can create a role and associate that role with the credentials. The remote asset manager can then bind that role to all configuration actions by that user. The remote asset manager can also associate the credentials with a viewing role that is independent of a particular user. The viewing role can map to a viewing action for any authenticated login.

At block 303, the remote asset manager selects a role associated with an action that accesses a service provider in response to detecting the action. For instance, the remote asset manager detects an action to create a virtual storage environment with resources of a service provider.

At block 305, the remote asset manager obtains credentials associated with the role. Continuing with the example above, the remote asset manager obtains the credentials associated with the role that maps to the create action.

At block 307, the remote asset manager determines an interface for the service provider. The interface may be a running process, a remote process, a library of function calls, etc. Regardless of the particular implementation of the interface, there may be multiple different interfaces for different service providers. The indication of the action will also indicate a service provider or will be accompanied with an indication of the service provider. The remote asset manager uses this indication to determine the interface.

At block 309, the remote asset manager submits the action with the obtained credentials to the service provider. In the case of multiple actions on a same target, the credentials may need only be obtained and submitted for the initial action. For instance, an initial action may be to create a virtual storage environment. After the credentials are obtained to access resources of the service provider for creating the virtual storage environment, the subsequent actions (e.g., create a controller, create an array, create a switch, etc.) may be in a portal or session established with the service provider. Thus, these subsequent actions are done under the submitted credentials. In other cases, subsequent actions will lead to the remote asset manager obtaining credentials for each of the actions.

Figure 4:
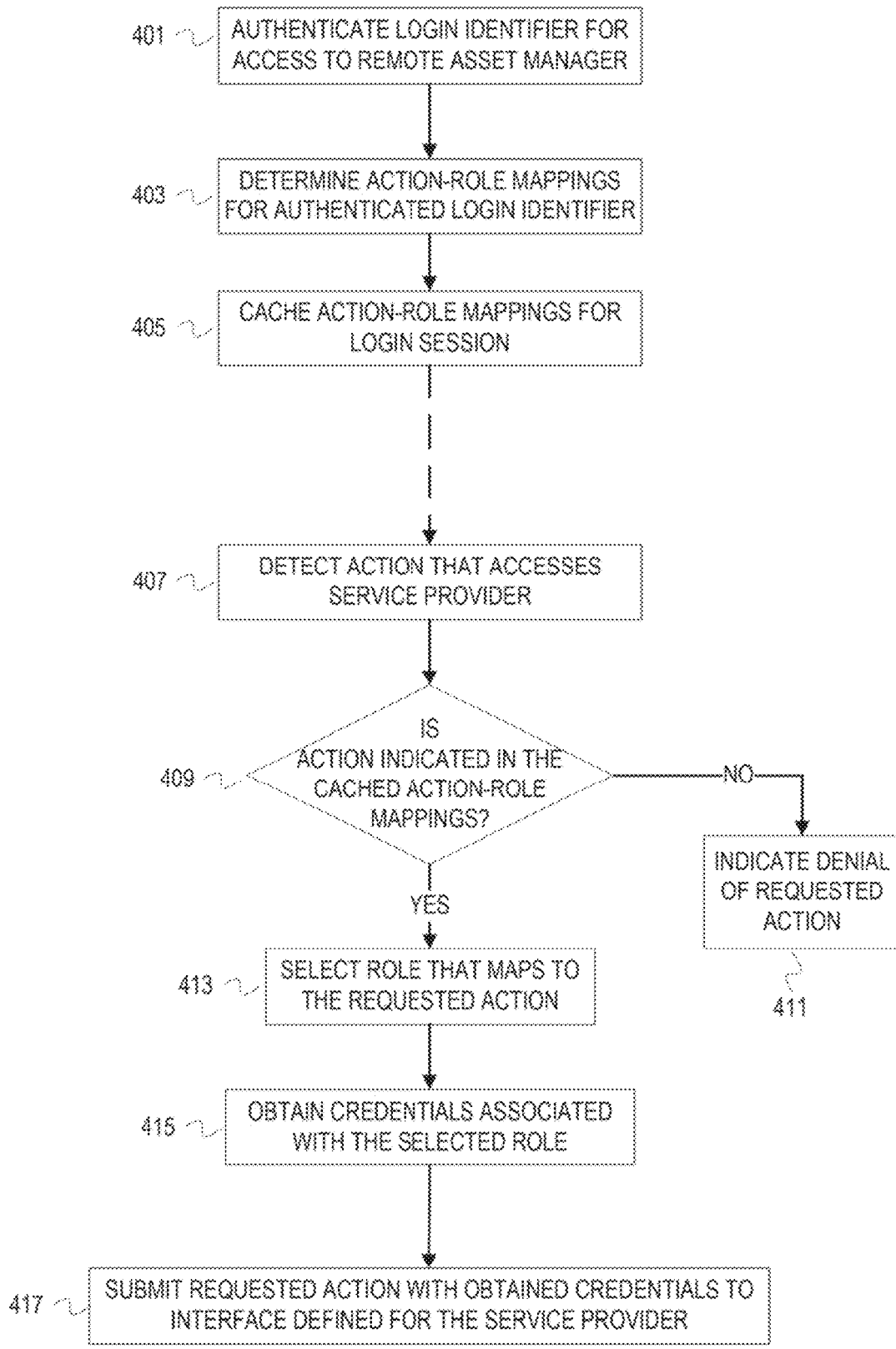
FIG. 4 is a flowchart of less coarsely grained example operations for isolating tenants with action based roles in a multi-tenant environment.

FIG. 4 is a flowchart of less coarsely grained example operations for isolating tenants with action based roles in a multi-tenant environment. The example operations are described as if performed by a remote asset manager as in FIG. 3.

At block 401, a remote asset manager authenticates a login identifier for access to the remote asset manager. As mentioned previously, examples of the login identifier includes a user identifier and process identifier.

At block 403, the remote asset manager determines action-role mappings for the authenticated login identifier.

As an example, the remote asset manager can access a structure that indexes the mappings by login identifiers. Each login identifier can be associated with a mapping of action indications to roles. The action indications can be function names, action identifiers (e.g., alphanumeric identifiers), classes of actions, etc.

At block 405, the remote asset manager caches the determined action-role mappings for the login session. The caching of the mappings does not refer to storing the mappings in any particular type of memory/storage. The remote asset manager "caches" the mappings by storing the determined mappings into memory or storage that is quickly accessible to the remote asset manager (e.g., into the address space of random access memory being used by the remote asset manager). However, the remote asset manager can store the mappings into a hardware structure (e.g., fast lookup table) for quick access. This allows the remote asset manager to determine the proper roles for requested actions with minimal delay.

After the authentication and caching of action-role mappings, the remote asset manager may detect an action that accesses a service provider at block 407. The dashed line between blocks 405 and 407 represents the dependence between blocks but possible lack of direct temporal sequencing. The remote asset manager receives an indication of an action that may access a co-located asset or a virtualized asset of the service provider. If the remote asset manager has access to multiple service providers (i.e., service provider interfaces), the action remote asset manager also receives an indication of the service provider/interface.

At block 409, the remote asset manager determines whether the indicated action is represented in the cached action-role mappings. If the action is represented in the mappings, then control flows to block 413. If not, then control flows to block 411.

At block 413, the remote asset manager selects a role that maps to the indicated action. The mappings can be a table structure that has an entry for each action indication to a role, so the remote asset manager reads the proper entry or can reference the role.

At block 415, the remote asset manager obtains the credentials associated with the selected role. The credentials may be cached with the mappings or may be separately stored.

At block 417, the remote asset manager submits the requested action with the obtained credentials to an interface defined for the service provider. The remote asset manager can invoke a function defined by an application programming interface to submit the requested action to the service provider with the credentials. The remote asset manager can convey the requested action and credentials to a separate process/module that forms a request for transmission to the service provider. The result of the request will return to the remote asset manager via the service provider interface.

If the requested action was not represented in the mappings, then the remote asset manager indicates a denial of the requested action at block 411. The remote asset manager can present a prompt to a user that the requested action is not allowed. The remote asset manager can reply to a requesting process. The reply can indicate that the action is not allowed for the requesting process.

Figure 5:
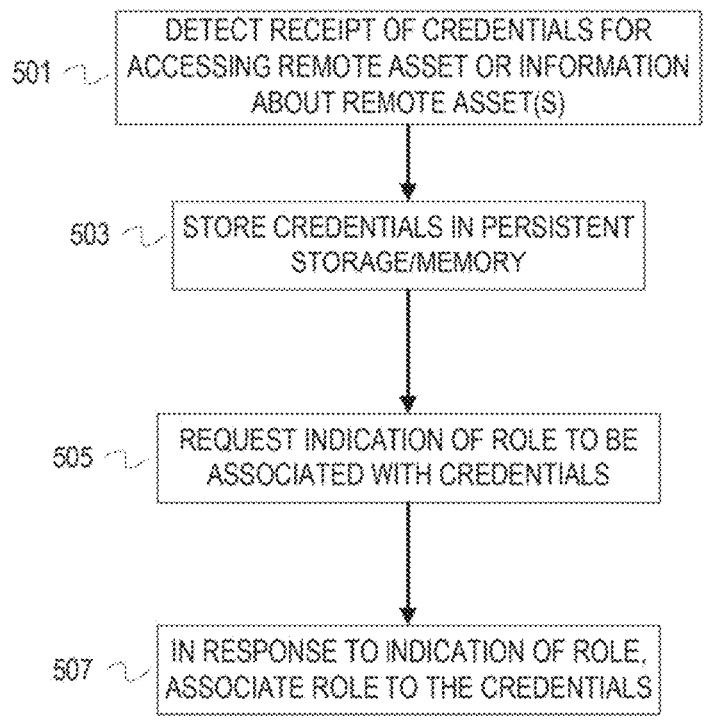
FIG. 5 is a flowchart of example operations for initial association of credentials.

The above refers to credentials multiple times. The credentials for a service provider account and/or co-located asset are initially obtained when an account is created or asset is established in the service provider. FIG. 5 is a flowchart of example operations for initial association of credentials.

At block 501, a remote asset manager detects receipt of credentials for accessing a remote asset or information about a remote asset(s). For instance, when an account is established (or first accessed) with the remote asset manager, the service provider may communicate credentials.

At block 503, the remote asset manager stores the credentials in a persistent memory/storage. The remote asset manager can secure the credentials also. The credentials can be encrypted, for example.

At block 505, the remote asset manager requests indication of a role to be associated with the obtained credentials. The remote asset manager may prompt a user to create a role or select an already defined role. The remote asset manager may present a lists of roles already associated with the login identifier corresponding to a current session in which the credentials are obtained.

At block 507, the remote asset manager associates the obtained credentials with a role in response to indication of the role. The remote asset manager can associate a reference to the credentials with the role. If the role is implemented as a data structure, the credentials can be embedded in the role or instantiated as a variable in the role structure.

As will be appreciated by one skilled in the art, embodiments may be embodied as a system, method or program code/instructions stored in one or more machine-readable media. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Embodiments are described with reference to flowchart illustrations and/or block diagrams of methods, apparatus (systems) and program code according to aspects of the disclosure. It will be understood that each block of the flowchart illustrations and/or block diagrams, and combinations of blocks in the flowchart illustrations and/or block diagrams, can be implemented by program instructions. These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These program instructions may also be stored in a machine readable medium that can direct a computer, other programmable data processing apparatus, or other devices to function in a particular manner, such that the instructions stored in the machine readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for secure, multi-tenant isolation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method, comprising: identifying a requested action to be performed on behalf of a user for a remote asset; identifying a role mapped to the requested action, the user being bound to the role for the requested action to be performed, wherein the role is an identifier providing a level of indirection between authenticated users and credentials for accessing service provider resources that support remote assets, wherein the credentials are embedded within or instantiated as a variable in a role data structure of the role, at a remote asset manager, and wherein multiple different credentials are associated with the role;
   encrypting the credentials using a key assigned to the remote asset manager to create encrypted credentials;
   caching the encrypted credentials and action-role mappings of the role data structure as session data;
   in response to identifying the requested action, querying the session data to identify an action-role mapping between the requested action and the role;
   utilizing the action-role mapping to identify the encrypted credentials;
   decrypting the encrypted credentials to access the credentials for accessing the remote asset
   extracting credentials from the role data structure of the role mapped to the requested action to be performed on behalf of the user;
   receiving, by a gateway, a request from the remote asset manager that provides access to remote assets supported by a cloud service provider, wherein the request includes the credentials and the requested action;
   identifying, by the gateway, the remote asset targeted by the request; and
   routing, by the gateway, the request to the remote asset, wherein the requested action is performed for the remote asset based upon the credentials.

2. The method of claim 1, wherein the remote asset is associated with at least one of a database or a storage controller, and the routing comprises:
   routing the request to the database or the storage controller.

3. The method of claim 1, wherein the receiving comprises:
   receiving the request from a service provider interface associated with the remote asset manager.

4. The method of claim 3, wherein the request is formatted by the service provider interface according to a format utilized by the cloud service provider.

5. The method of claim 1, comprising:
   evaluating a database of the cloud service provider to identify the remote assets.

6. The method of claim 5, wherein the database is populated with elements, configurations, and domain topology associated with the remote assets.

7. The method of claim 1, comprising:
   hosting a plurality of gateways, including the gateway, to provide access to the remote assets.

8. The method of claim 1, wherein a domain of the cloud service provider comprise a co-located storage controller, a co-located network switch, and a virtualization storage array.

9. The method of claim 8, comprising:
providing, by the gateway, access to the co-located storage controller.

10. The method of claim 8, comprising:
providing, by the gateway, access to the co-located network switch.

11. The method of claim 8, comprising:
providing, by the gateway, access to the virtualization storage array.

12. The method of claim 8, wherein the virtualization storage array is supported by a virtualization layer.

13. The method of claim 12, wherein the domain comprises a virtual asset associate with the virtualization layer.

14. A non-transitory machine readable medium having stored thereon instructions, which when executed by a machine, causes the machine to:
identify a requested action to be performed on behalf of a user for a remote asset;
identify a role mapped to the requested action, the user being bound to the role for the requested action to be performed, wherein the role is an identifier providing a level of indirection between authenticated users and credentials for accessing service provider resources that support remote assets, wherein the credentials are embedded within or instantiated as a variable in a role data structure of the role, at a remote asset manager, and wherein multiple different credentials are associated with the role;
encrypting the credentials using a key assigned to the remote asset manager to create encrypted credentials;
caching the encrypted credentials and action-role mappings of the role data structure as session data;
in response to identifying the requested action, querying the session data to identify an action-role mapping between the requested action and the role;
utilizing the action-role mapping to identify the encrypted credentials;
decrypting the encrypted credentials to access the credentials for accessing the remote asset
extracting credentials from the role data structure of the role mapped to the requested action to be performed on behalf of the user;
receive, by a gateway, a request from a remote asset manager that provides access to remote assets supported by a cloud service provider, wherein the request includes the credentials and the requested action;
identify, by the gateway, the remote asset targeted by the request; and route, by the gateway, the request to the remote asset, wherein the requested action is performed for the remote asset based upon the credentials.

15. The non-transitory machine readable medium of claim 14, comprising:
process the request utilizing cached session data.

16. A computing device, comprising: a memory comprising machine executable code;
and a processor coupled to the memory, the processor configured to execute the machine executable code to cause the processor to:
identify a requested action to be performed on behalf of a user for a remote asset; identify a role mapped to the requested action, the user being bound to the role for the requested action to be performed, wherein the role is an identifier providing a level of indirection between authenticated users and credentials for accessing service provider resources that support remote assets, wherein the credentials are embedded within or instantiated as a variable in a role data structure of the role, at a remote asset manager, and wherein multiple different credentials are associated with the role;
encrypt the credentials using a key assigned to the remote asset manager to create encrypted credentials;
cache the encrypted credentials and action-role mappings of the role data structure as session data;
in response to identifying the requested action, query the session data to identify an action-role mapping between the requested action and the role;
utilize the action-role mapping to identify the encrypted credentials;
decrypt the encrypted credentials to access the credentials for accessing the remote asset
extract credentials from the role data structure of the role mapped to the requested action to be performed on behalf of the user; receive, by a gateway, a request from a remote asset manager that provides access to remote assets supported by a cloud service provider, wherein the request includes the credentials and the requested action;
identify, by the gateway, the remote asset targeted by the request; and route, by the gateway, the request to the remote asset, wherein the requested action is performed for the remote asset based upon the credentials.

17. The computing device of claim 16, wherein the machine executable code causes the processor to:
receive the request from a service provider interface associated with the remote asset manager.

18. The computing device of claim 17, wherein the request is formatted by the service provider interface according to a format utilized by the cloud service provider.

* * * * *